US011125889B2

(12) United States Patent
 Veitsel et al.

(10) Patent No.: US 11,125,889 B2
(45) Date of Patent: Sep. 21, 2021

(54) METHOD OF REDUCING INTER-CHANNEL BIASES IN GLONASS GNSS RECEIVERS

(71) Applicant: Topcon Positioning Systems, Inc., Livermore, CA (US)

(72) Inventors: Vladimir Victorovich Veitsel, Moscow (RU); Andrey Vladimirovich Veitsel, Moscow (RU); Konstantin Vladimirovich Chereshnev, Moscow (RU)

(73) Assignee: Topcon Positioning Systems, Inc., Livermore, CA (US)

(*) Notice: Subject to any disclaimer, the term of this patent is extended or adjusted under 35 U.S.C. 154(b) by 174 days.

(21) Appl. No.: 16/557,870

(22) Filed: Aug. 30, 2019

(65) Prior Publication Data
US 2019/0383947 A1   Dec. 19, 2019

Related U.S. Application Data

(62) Division of application No. 15/025,722, filed as application No. PCT/US2015/000598 on Sep. 23, 2015, now abandoned.

(51) Int. Cl.
*G01S 19/30* (2010.01)
*G01S 19/23* (2010.01)
*H04B 1/7073* (2011.01)
*H04B 1/7085* (2011.01)
*H04B 1/7075* (2011.01)

(52) U.S. Cl.
CPC .............. *G01S 19/30* (2013.01); *G01S 19/23* (2013.01); *H04B 1/7085* (2013.01); *H04B 1/70757* (2013.01)

(58) Field of Classification Search
None
See application file for complete search history.

(56) References Cited

U.S. PATENT DOCUMENTS

| 5,949,372 A | 9/1999 | Lennen | |
|---|---|---|---|
| 5,953,367 A * | 9/1999 | Zhodzicshsky | ......... G01S 19/22 375/147 |
| 6,313,789 B1 * | 11/2001 | Zhodzishsky | ........... G01S 19/29 342/357.68 |
| 7,764,226 B1 * | 7/2010 | Veitsel | ................... G01S 19/33 342/357.73 |

(Continued)

OTHER PUBLICATIONS

Avagnina et al. "Definition of a Reconfigurable and Modular Multi-Standard Navigation Receiver." GPS Solutions (2003). pp. 33-40. (Year: 2003).*

(Continued)

*Primary Examiner* — Gregory C. Issing
(74) *Attorney, Agent, or Firm* — Bardmesser Law Group

(57) ABSTRACT

The present invention discloses methods of accuracy improving for code measurements in GLONASS GNSS receivers. One component of error budget in code measurements of GLONASS receivers is caused by a difference in signal delays arising in the receiver analog Front End and antenna filter on different channel frequencies specific to GLONASS satellites. Methods to compensate for differences in delays for different GLONASS channel frequencies have been proposed using data collected from a GLONASS signals simulator.

12 Claims, 10 Drawing Sheets

(56) References Cited

U.S. PATENT DOCUMENTS

| | | | | |
|---|---|---|---|---|
| 8,373,593 B2* | 2/2013 | Zhodzishsky | ............ | G01S 19/54 |
| | | | | 342/357.75 |
| 2007/0160120 A1* | 7/2007 | Simpson | ................. | G01S 19/30 |
| | | | | 375/149 |
| 2011/0181467 A1* | 7/2011 | Samavati | ................ | G01S 19/37 |
| | | | | 342/357.73 |
| 2012/0242542 A1 | 9/2012 | Yudanov et al. | | |
| 2013/0141280 A1* | 6/2013 | Huang | .................... | G01S 19/33 |
| | | | | 342/357.76 |

OTHER PUBLICATIONS

Al-Shaery et al. "An Enhanced Calibration Method of GLONASS Inter-Channel Bias for GNSS RTK". GPS Solutions (2013). pp. 165-173. (Year: 2013).*

Search Report in PCT/RU/2015/000598, dated Jul. 14, 2016.

* cited by examiner

METHOD OF REDUCING INTER-CHANNEL BIASES IN GLONASS GNSS RECEIVERS

CROSS-REFERENCE TO RELATED APPLICATIONS

This application is a divisional of U.S. patent application Ser. No. 15/025,722, filed on Mar. 29, 2016, which is a US national phase of PCT/RU2015/000598, filed on Sep. 23, 2015.

FIELD OF THE INVENTION

The present invention relates generally to GNSS receivers, and more particularly, to enhancing accuracy of code measurements based on GLONASS signals with a frequency division of channels.

BACKGROUND OF THE INVENTION

Modern high-precision GNSS receivers are capable of receiving and processing signals from some different satellite systems, at least from GPS and GLONASS. A well-known peculiarity of GLONASS is frequency division multiply access. Each GLONASS satellite transmits a navigation signal modulated by the same pseudo-random code but it is emitted on its individual frequency. These carrier frequencies are usually called channel numbers or channel frequencies, and they are currently numbered from −07 up to +07. GLONASS satellites transmit signals into two frequency ranges: upper (L) and lower (L2). In the L1, the frequency of 1602 MHz corresponds to number 00, all the rest carrier frequencies (channel numbers) are divided into j·562.5 kHz, and in the L2 range, frequency 1246 MHz corresponds to 00, other channel numbers are divided into j·437.5 kHz, where j is the channel number.

All GLONASS satellites transmit two pseudo-random codes on each frequency: a standard accuracy code and a high-precision code.

It should be noted that in the English language technical literature, Standard Accuracy code similar to GPS pseudo-random sequences is designated as CA-code, and High-Precision code is designated as P-code.

Both codes are an M-sequence with duration of 1 ms. Clock rate of the CA-code is 511 kHz, and the clock rate of the P-code is 5.11 MHz. According to these values, the bandwidth, concentrating practically the whole signal power, for the P-signal, is almost 10 times wider than that of CA-signal. If one considers the whole constellation of GLONASS satellites, then CA-signals in the L1 range take the bandwidth≈9 MHz, and the P-signals−≈18 MHz. In the L2 band, CA-signals use≈8 MHz and P-signals≈16 MHz.

A navigation receiver consists of analog and digital components. The analog component amplifies signals, produces heterodyning (down conversion of carrier frequency), and filters signals, while the digital component separates a signal envelope (demodulation) and measures signal parameters, including signal arrival time. This time in navigation receivers means the moment of beginning/ending of PRN-code, which modulates the carrier signal of a satellite.

A common analog component is normally used to receive signals from all GLONASS satellites, and signal division from different satellites is implemented in receiver digital component as a demodulation block.

When passing the receiver antenna filters and the analog front end, the signal is delayed. The value of the delay depends on the filter's phase-frequency characteristic (PFC). If the PFC were linear, all the signals irrespective of carrier frequencies would have the same delay. But in practice, due to non-linearity of the PFC, signals of different GLONASS satellites have different delays in the receiver.

The receiver digital component measures time of arrival of a signal from each satellite. Such measurements are often called code measurements, since they relate to the time of delivering the modulating PRN code. The code measurements are also called pseudo-ranges, emphasizing that the measurements are coordinated to the receiver time scale that is different from the transmitter time scale. As operation of all satellites is synchronized by the system, one can say that there is an offset between receiver and GNSS scales.

The difference in code measurements for various satellites (when the position of satellites is known) enables to solve the navigation task and determine receiver location. In solving the navigation task, a delay in the radio path, common for all the satellites, affects only the offset between the receiver time scale and the GNSS time scale. But different delays for different satellites directly affect positioning accuracy; therefore, they can be regarded as code errors. Such differences, re-computed into equivalent ranges and expressed in meters, are called "biases" in the English technical literature.

Conventional art and our experience have shown that a difference in receiving GLONASS signals on various channel frequencies can achieve 3-6 ns, which is equivalent to biases (code errors) up to ±1 m-±2 m.

Biases noticeably worsen GLONASS positioning accuracy, and much attention has been recently paid to methods of reducing these errors.

Reference [6] considers technical solutions enabling to reduce a difference between two different receivers rather than receiver biases themselves. The paper stated that such an approach efficiently increases positioning accuracy in solving the navigation task for differential navigation, i.e., in case of positioning a receiver relative to another one.

References [1, 4, 7] describe different methods to determine biases using different frequencies of the first heterodyne. It is proposed to adjust frequency of the first heterodyne and compare measurement results for different GLONASS channel frequencies. It is noted that the biases obtained in this manner take into account a difference in signal delays arising in SAW filter on receiver intermediate frequency. SAW filter parameters strongly depend on temperature, and therefore one needs to regularly carry out such temperature measurements.

References [2, 3, 5] discuss methods of compensating biases in real-time. To do this, a GLONASS simulator integrated with the navigation receiver is used. A simulator signal is fed to the input of the receiver Front-End. To compensate for biases, references [2, 3] suggest that the difference between generation of the simulation signal and its reception (after it has been delayed in the Front-End) should be used; and in reference [5] it is proposed to measure a difference between reception times for different simulation signals.

Below there are considered the three methods of obtaining GLONASS code measurements, which providing a considerable reduction in errors caused by receiver PFC non-linearity.

SUMMARY OF THE INVENTION

Three methods of reducing errors in GLONASS code measurements are proposed. The methods relate to errors caused by a difference in delays of receiver analog Front End receiving GLONASS signals on different channel frequencies. Such a difference on different channel frequencies is caused by non-linearity of radio path phase-frequency characteristic (PFC). The delay, its frequency dependence and temperature stability substantially depend both on filters employed in the receiver analog component and digital techniques of obtaining code measurements.

The first of the proposed methods includes measuring and applying corrections, which compensate for code biases, taking into account their temperature instability.

The second method suggests that code measurements be obtained taking into account a delay change in the receiver analog block being compensated due to changing an operating point of the DLL discriminator characteristic.

The third method proposes the use of high-precision GLONASS signals as code measurements.

The proposed methods consider a GLONASS simulator, not being an integral component of the receiver, to obtain corrections. Such an approach enables taking into account different delays caused, for example, in antennas located out of the receiver, eliminate effects of the simulation signal on signal reception from GLONASS GNSS satellites and use simpler schematics solution in receiver designs.

Additional features and advantages of the invention will be set forth in the description that follows, and will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention.

Two main parts can be separated in navigation receivers: antenna and the receiver itself. Antennas for high-precision navigation receivers typically include a receiving antenna element, a low-noise amplifier and an antenna filter. The antenna filter is intended for isolating a frequency range for operation with one or some GNSSs.

Modern navigation receivers include mainly analog components and a digital component.

The analog component in turn includes antenna filters and an analog Front End. Generally, these include signal amplifiers, frequency converters, a quartz clock generator, intermediate frequency synthesizers, and some filtration cascades. Three filtration cascades are most often used: high-frequency, intermediate and low-frequency.

High-frequency filtration is intended for separating signals of a specific GNSS in the upper and/or lower frequency bands and has mostly a wide bandwidth. Such a bandwidth can be up to 60 MHz in the upper band and 140 MHz in the lower band.

Intermediate filtration should first provide interference immunity of the receiver from undesired interference, and, second, secure high accuracy of code measurements. SAW filters with a bandwidth of 20-30 MHz are often used for intermediate filtration.

Low-frequency filtration suppresses parasitic harmonics which occur during frequency conversion. The bandwidth of these filters is usually 30-50 MHz.

A receiver includes a combination of antenna filters and an analog Front End, determining receiver through common amplitude-frequency characteristic (AFC) and phase-frequency characteristic. Common AFC and PFC depend on the predetermined frequency plan, i.e., frequency-conversion schematics.

Figure 1A:
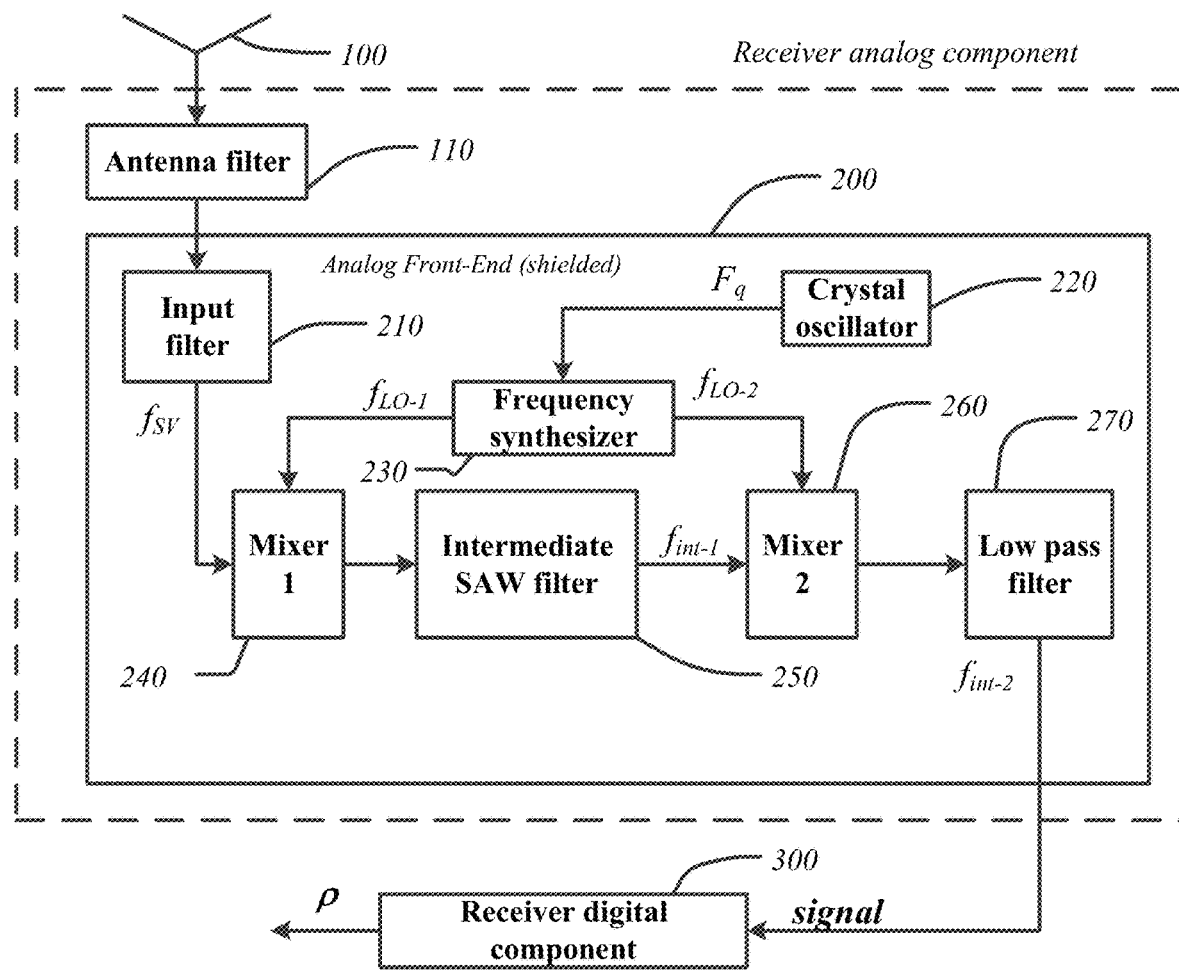
FIG. 1A shows a typical functional schematic of navigation receiver, its analog component and Front-End.

FIG. 1A shows an example of typical receiver analog components with double frequency conversion. Only those analog elements that relate to the substance of the invention are shown in this figure.

Signals from satellites are received by an antenna element (100) and after passing through an antenna filter (110) are fed to a receiver analog Front End (200) that is in a shielded box. The required frequency plan is guaranteed by a frequency synthesizer (230) generating frequencies $F_{LO\text{-}1}$ and $F_{LO\text{-}2}$ from frequency $F_q$ of a quartz generator (220). After a first mixer (230) and intermediate frequency filter (250) the signal is transferred to the first intermediate frequency $f_{int\text{-}1}$. After second mixer (260) and low-frequency filter (270) the signal is transferred to the second intermediate frequency $f_{int\text{-}2}$. Different frequencies $f_{int\text{-}2,j}$ correspond to different GLONASS satellites. After the signals passed through the analog Front End, they come into a receiver digital component (300) wherein all necessary measurements are generated.

Expressions for the common AFC and PFC for the schematics in question can be as follows $$G_R(f)=G_1(f)+G_2(f)+G_3(f-f_{LO\text{-}1})+G_4(f-f_{LO\text{-}1}-f_{LO\text{-}2}) \quad (1)$$

$$\Phi_R(f)=\Phi_1(f)+\Phi_2(f)+\Phi_3(f-f_{LO\text{-}1})+\Phi_4(f-f_{LO\text{-}1}-f_{LO\text{-}2}) \quad (2)$$

where $G_R(f)$ and $\Phi_R(f)$ are common AFC and PFC for the receiver analog component, correspondingly;

$G_1(f)$ and $\Phi_1(f)$ are the corresponding AFC and PFC of the antenna filter;

$G_2(f)$ and $\Phi_2(f)$ are the corresponding AFC and PFC of the Front-End high-frequency filter;

$G_3(f)$ and $\Phi_3(f)$ are the corresponding AFC and PFC of the Front-End first intermediate frequency filter installed at the first intermediate frequency;

$G_4(f)$ and $\Phi_4(f)$ are the corresponding AFC and PFC of the Front-End low frequency filter installed at the second intermediate frequency;

$f_{LO-1}$ and $f_{LO-2}$ are the frequencies of the first and second heterodynes correspondingly, providing the predetermined receiver frequency plan.

In equations (1) and (2) AFCs of filters should be in dB, and PFCs in cycles, frequency in Hz. A signal delay of the receiver analog component (in seconds) can be approximately:

$$\tau^R(f) = \frac{d}{df}[\Phi_R(f)] \quad (3)$$

Expression $\tau^R(f)$ in (3) is called "group delay" and it enables to determine precisely enough a delay only for narrowband signals, i.e., when PFC non-linearity is negligible. A more exact calculation of a delay of the modulated signal takes into account the whole signal spectrum. But expression (3) can be useful for further description and understanding.

PFC $\Phi_R(f)$ is typically a non-linear function of frequency f, and hence signals from each GLONASS satellite take different delays $\tau_j^R(f_j)$ in the receiver analog component.

Figure 2A:
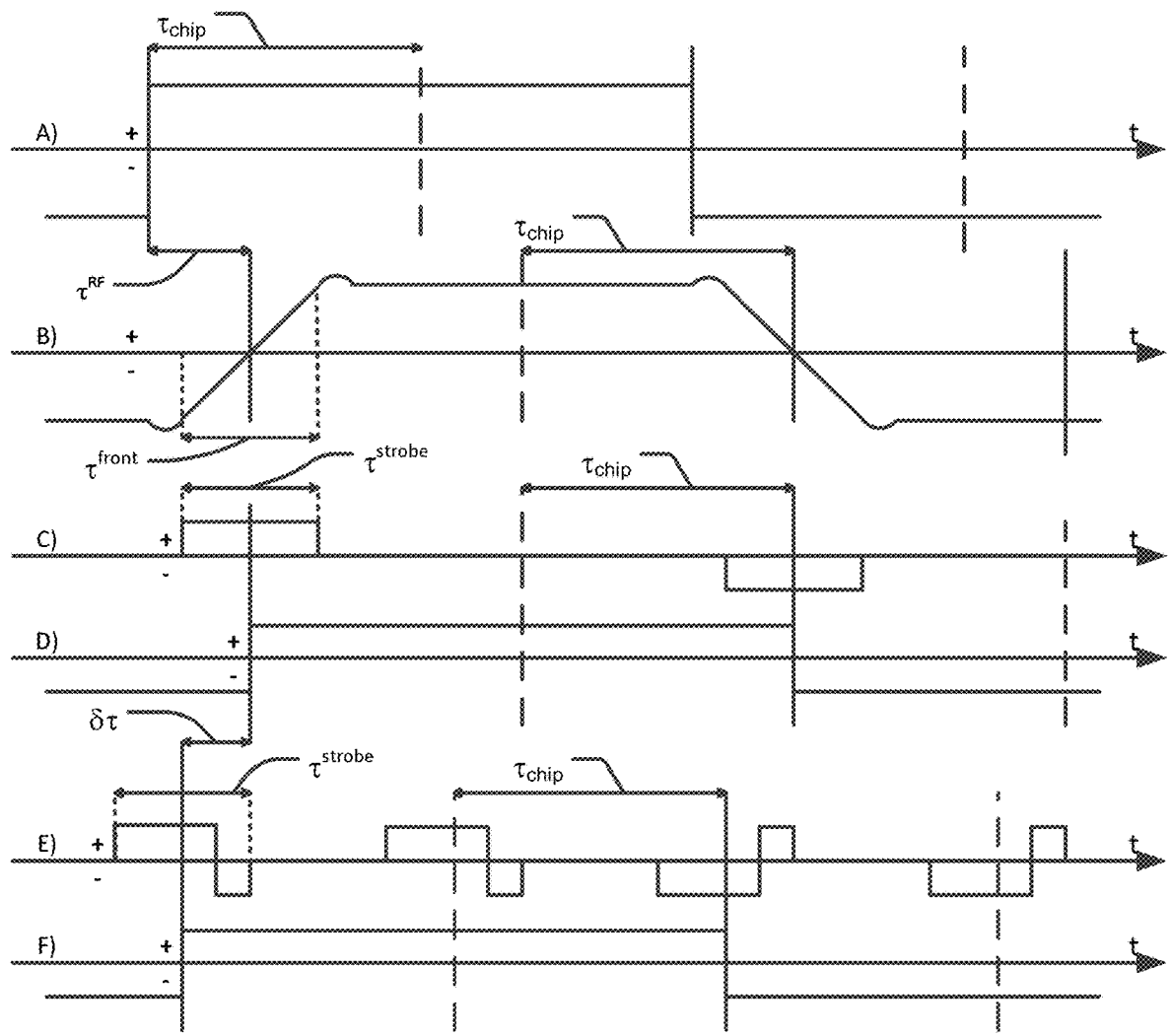
FIG. 2A shows envelope curves for navigation signals, a reference code sequence and some variants of reference strobe sequences.
Figure 2B:
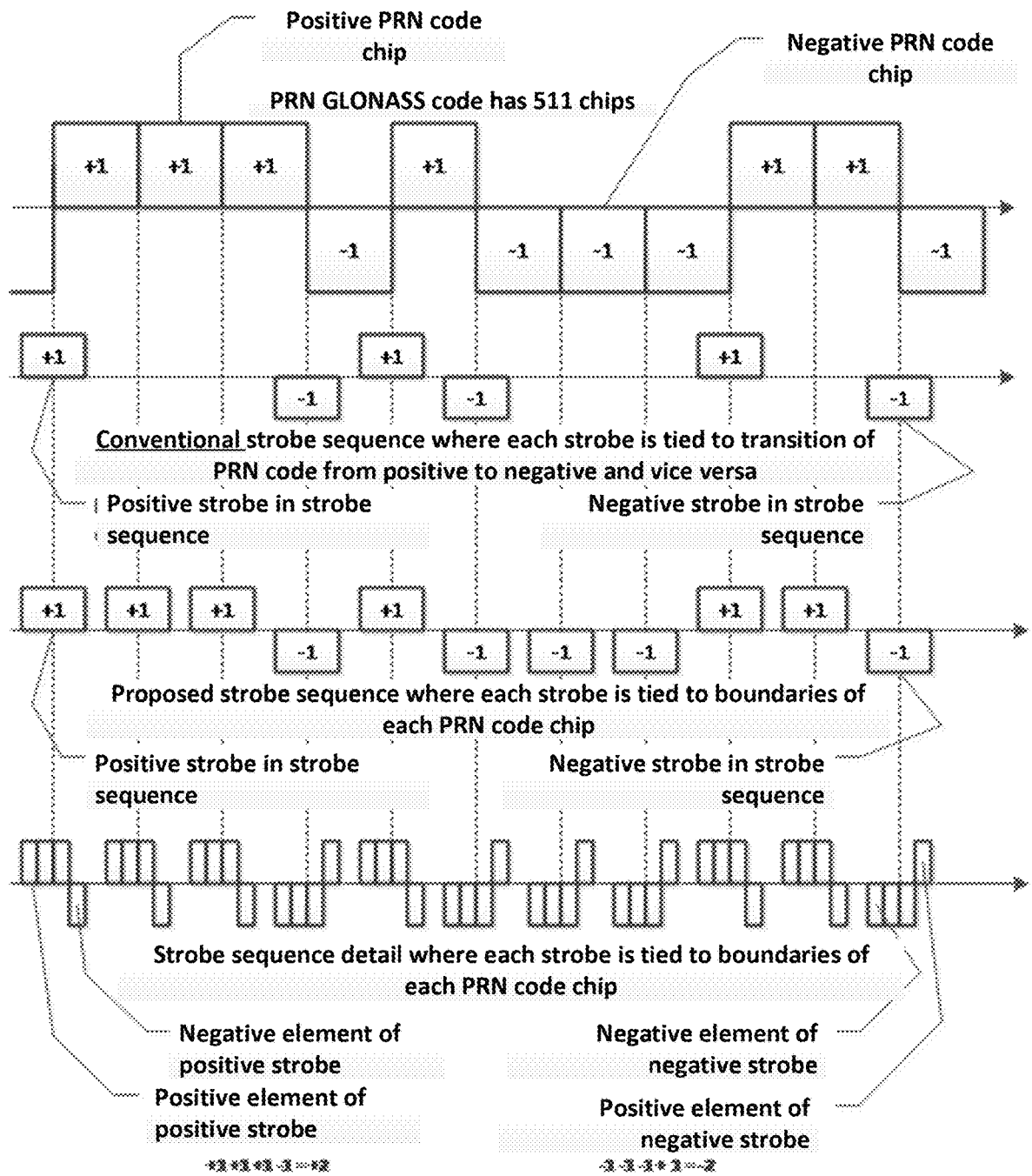
FIG. 2B is based on FIG. 2A, and highlights the differences between the conventional approach and one embodiment of the invention.

Curves A) and B) in FIG. 2A illustrate signal conversion in the analog Front End. FIG. 2B is based on FIG. 2A, and highlights the differences between the conventional approach and one embodiment of the invention.

Curve A) in FIG. 2A presents a fragment of the signal envelope at the antenna input, and curve B) shows the corresponding fragment at the analog component output for a conventional navigation receiver. It can be seen from the figure that, first, the time instant of changing the code sign at the output happens later than at the input, and second, if the sign of the code sequence changes fast enough at the input, then at the output the same process takes some time that is often called the front duration $\tau^{front}$.

The most important task of the receiver digital component is to obtain parameters of measurements of the received signal needed for solving the navigation task and determining a receiver position.

Figure 3A:
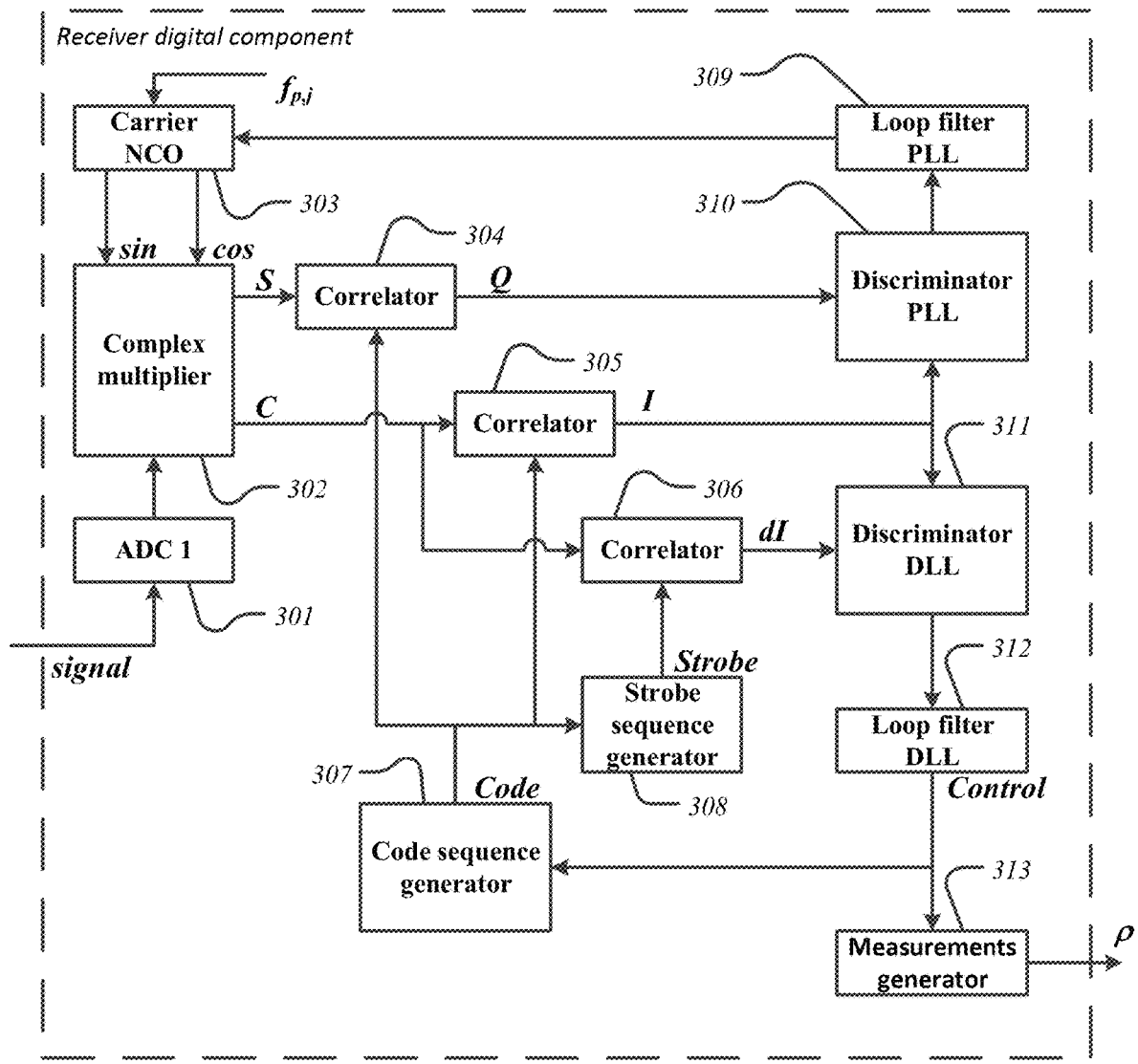
FIG. 3A shows a typical functional schematic of receiver digital component.

Measuring signal parameters in navigation receivers is described in detail in the technical literature. In particular, in reference [3] there is described a commonly-used method of building high-precision digital receivers. A simplified version of the receiver digital component is shown in FIG. 3A.

An analog signal is converted in the digital form with an analog-digital converter (ADC) (301) and is then fed to digital tracking loops PLL and DLL.

Tracking of the input signal phase and frequency is implemented by PLL consisting of the following main components: complex multiplier (302), carrier NCO (303), correlators (304) and (305), discriminator (310) and loop filter (309).

Omitting PLL structure and operation, one should note that carrier NCO (303) is used for separate processing of GLONASS signals. This NCO generates in digital form two quadrature components (sin and cos) of the harmonic oscillation with nominal $f_{p,j}$, corresponding to one of the GLONASS channel frequencies, and a difference between the real satellite signal and its nominal value in frequency and phase is generated by control signals of the carrier NCO (303) from PLL filter (309). Note that FIG. 3 presents loops PLL and DLL tracking only one GLONASS satellites, similar schemes are implemented for other satellites.

A Delay lock loop (DLL) tracks changes in signal arrival times. Main elements of DLL are a controlled code sequence generator (307) and controlled strobe sequence generator (308), two correlators (305) and (306) generating correlation components I and dI, respectively, DLL discriminator (311) and DLL loop filter (312). With signals of the loop filter (312), block (313) generates code measurements $\rho_j$.

To receive signals, the code sequence generator (307) generates a pseudo-random M-sequence corresponding to the PRN code transmitted by GLONASS satellites. The position in time of this sequence is defined by control signals which are fed from the generator (307) from the DLL loop filter (312). This sequence is fed to correlator (305), where it is multiplied by the input in-phase quadrature signal C from the output of complex multiplier (302) and stored over the pre-determined time $T_C$ ($T_C$ is often selected equal to 5 ms). The so-obtained number is called correlation signal I.

The same code sequence from generator (307) is also fed to strobe sequence generator (308). The most used and well-known strobe sequence is a sequence of rectangular pulses, the center of which coincides with sign changes instants in the reference code sequence and the polarity (sign) of the pulse match the sign of the next chip code, i.e., if the code changes its sign from (−) to (+), the sign of the strobe will be positive, otherwise (from (+) to (−)-negative. Such strobes and sequences are often called "simple". A fragment of the simple strobe sequence is shown in curve C) of FIG. 2A, and in curve D) there is the corresponding fragment of the reference code sequence.

The strobe sequence generated in block (308) is fed to correlator (306), at the output of which there is generated correlation signal dI. Correlator (306) works in the same way as correlator (305) described above. The output signals I and dI of correlators (305) and (306), further come to DLL discriminator (311).

The most known and used discriminator calculates the ratio of these two correlation signals, i.e., the generating discriminator signal according to $$z^{dll} = \frac{dI}{I}, \quad (4)$$

Figure 4:
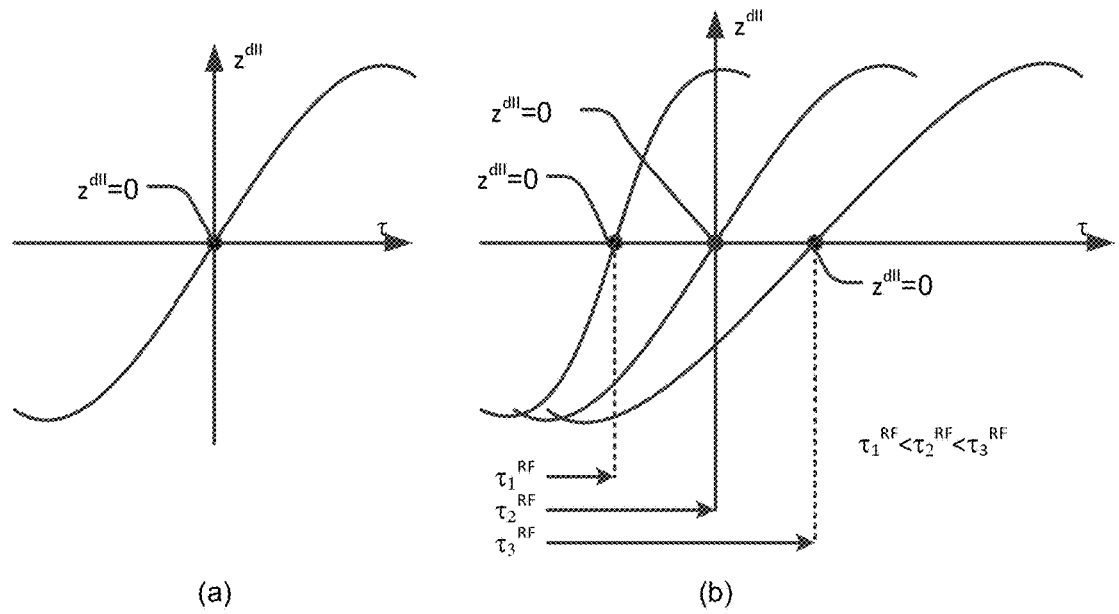
FIG. 4 shows discriminator curves of DLL.
Figure 4:
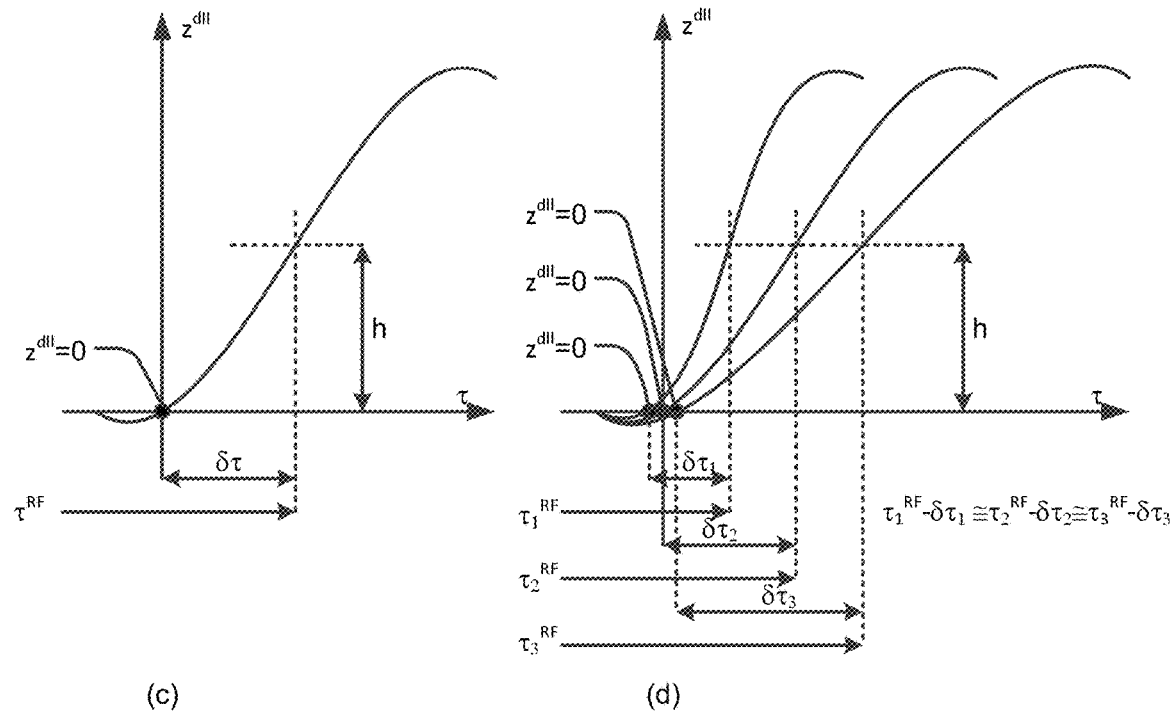

A signal dependence at the discriminator output $z^{dll}(\tau)$ on the time mismatch between the input signal envelope and reference code sequence $\tau$ is often used DLL discriminator characteristic. See FIG. 2A. A typical discriminator characteristic for a "simple" strobe sequence is shown in FIG. 4, graph (a). The discriminator signal, depending on advancing or slowing the reference code sequence relative to the input signal envelope ($\tau > 0$ or $\tau < 0$), changes it sign from (+) to (−), or otherwise. A point wherein $z^{dll}(\tau) = 0$ is hereafter called "working" discriminator point. For the case shown in curves B), C) and D) of FIG. 2A, at $z^{dll} = 0$, the instants of sign changes in the reference code sequence and input signal envelope coincide.

The signal from discriminator (311) is further fed to DLL loop filter (312). There are known different variants of building loop filters references [3, 4], the schematics and parameters of the filters determining DLL noise and dynamic properties. Signals at the output of the loop filter are used for controlling the reference generator and code (307) and strobe (308) sequences. In accordance with these signals, a time position of the code sequence and, respectively, strobe sequence changes. A closed tracking system (DLL) in the steady operation mode keeps the discriminator signal within a range of the "working" point ($z^{dll} \approx 0$) of the DLL discriminator.

Control signals generated by loop filter (312) are simultaneously fed to measurements generator (313)—a block of generating code measurements. In this block, the current beginning of the reference code sequence is taken as a current estimate of signal arrival time ($t^{Rec}$) measured according to the receiver clock scale. A satellite emits the signal at a time instant ($t^{Tr}$) (measured according to the satellite clock scale), and a difference between the signal arrival time and signal emission time can be used in calculating the so-called code measurements $$\rho = c \cdot (t^{Rec} - t^{Tr}) \tag{5}$$

where c is the speed of light.

A range-difference positioning method is used in GNSS receivers, therefore, only the difference in code measurements obtained for different satellites affects the positioning accuracy. Signal delays for different GLONASS satellites can differ due to non-linearity of PFC in the receiver analog component, and correspondingly, code measurements are dependent on this delay resulting in errors in positioning. FIG. 4, graph (b) shows a change in "working" point positions for the DLL discriminator characteristic as a function of changing the delay in the receiver analog component $\tau^{RF}$. The position of the reference code sequence in time also changes, and so do the code measurements.

To measure delay in the receiver analog component, a GLONASS simulator can be used. The so-called "double differences" allow eliminating a clock offset between satellite and receiver scales, i.e., generating a mathematical combination $$DD_j = [(\rho_j^{Rec} - \rho_{j=0}^{Rec}) - (\rho_j^{SIM} - \rho_{j=0}^{SIM})] \tag{6}$$

where $\rho_j^{Rec} = c \cdot t_j^{Rec}$; $t_j^{Rec}$ is the time of signal arrival measured according to the receiver clock scale;

$\rho_j^{SIM} = c \cdot t_j^{SIM}$; $t_j^{SIM}$ is the time of signal arrival measured according to the simulator clock scale, generated by the simulator for the given receiver location;

j is the satellite number or the channel number;

j=0 means that the measurement has been obtained at a randomly-selected channel frequency, for example, at the zero channel number.

If analog delays are different for different GLONASS channel numbers, the value $DD_j$ is other than zero. The combination (6) is often called GLONASS GNSS biases.

An external (relative to the receiver) signal simulator is proposed to be used to measure analog biases. Such a simulator can be employed, first, for bias measurements in receivers of different marks and units, and second, for determining biases caused by a non-linear PFC of the antenna filter in addition to Front-End biases. To solve the second task, an additional filter (110) used in the utilized antenna can be installed in the measurement path between the simulator output and Front-End input.

The previously-measured bias $DD_j$ can be further used as a correction data to compensate for the difference in the analog component delays, thereby leading the measurements to the combined value corresponding to a delay on a chosen channel frequency $$\rho_j^{corr} = \rho_j - DD_j \tag{7}$$

To apply the above-described approach, $DD_j$ should be unchangeable in time. A change in $DD_j$ biases first of all relates to possible temperature variation during following receiver service.

A maximal temperature operation range for navigation receivers is −40° C. . . . +75° C., sometimes this range is narrower: −20° C. . . . +50° C. Such considerable temperature variations are explained by possible use in different climate zones, and seasonal, weather, day and night changes in ambient/environmental temperatures. Also, receiver internal heat emission due to different operation modes and design heat production features can affect temperature changes.

Below there are considered different variants of possible solutions to providing temperature stability of corrected code measurements $\rho_j^{corr}$.

One embodiment suggests a method of obtaining such corrections that consider current temperature of the receiver. In this case, expression (7) is as follows $$\rho_j^{corr} = \rho_j(T) - DD_j^T(T) \tag{8}$$

where T is the temperature of the receiver or its components;

$DD_j^T(T)$ is the correction data for temperature T;

$\rho_j(T)$ is the primary code measurement at temperature T.

A study of the corrections-temperature dependence $DD_j^T$(T) for different receivers has shown that a variation of 25° C.-35° C. in temperature results in a change in the correction data no more than 10-15 cm for some GLONASS channel numbers, but for other channel numbers the change in the correction data reaches 0.8-1.2 m.

Analyzing delay behavior in different filters of the receiver analog Front End has enabled to state that some SAW filter types (250), which are installed on the first intermediate frequency, mainly contribute to the temperature dependence of biases for CA signal (FIG. 1). An oscillation type of delay-temperature variation is specific for this filter group. If the temperature varies by 50° C.-70° C., delay values are periodically repeated. Biases have the same periodic behavior in this case.

Research has shown that the bias-temperature dependence is in a good correlation with a function:

$$DD_j^T(T) = DD_j^0 + DD_j^1 \cdot (T - T_0) + DD_j^{max} \cdot \cos(\Omega_j \cdot T + \Psi_j) \tag{9}$$

where T is the current Front-End temperature;

$T_0$ is the nominal working Front-End temperature;

$DD^0$, $DD^1$, $DD^{max}$, $\Omega$, $\Psi$ are the function parameters which are specific for each channel number j. It should be noted that for some channel numbers biases are small (do not exceed ±0.1 m), and they are practically independent of temperature.

Bias periodicity and the possibility of describing biases behavior depending on temperature allow measuring biases within a temperature range of at least 50° C. in increments of maximum 10° C., and then predicting a bias value at different temperatures. Well-known interpolation methods help in such prediction within the temperature range, and extrapolation methods with a predetermined approximation function, for example, (9) are helpful out of this range.

To implement this method, temperature shall be measured at the location of intermediate frequency (IF) SAW filters (250) along with bias measurements. The analog Front End (200) is normally shielded, and the temperature of the analog Front End is higher than the ambient temperature. The implementation of this method is made by supplementing typical block-diagrams of the analog and digital components shown in FIG. 1A and FIG. 3A by elements presented in FIG. 1B and FIG. 3B. A temperature sensor (280) is installed in the shielded analog Front End (200) to measure IF SAW filter temperature. Readings of this sensor in (T° C.) are fed to the receiver digital component (300). In the receiver digital component (300) the readings are converted into digital form with the help of ADC (314), and then processed in the measurements generator (313).

Figure 6:
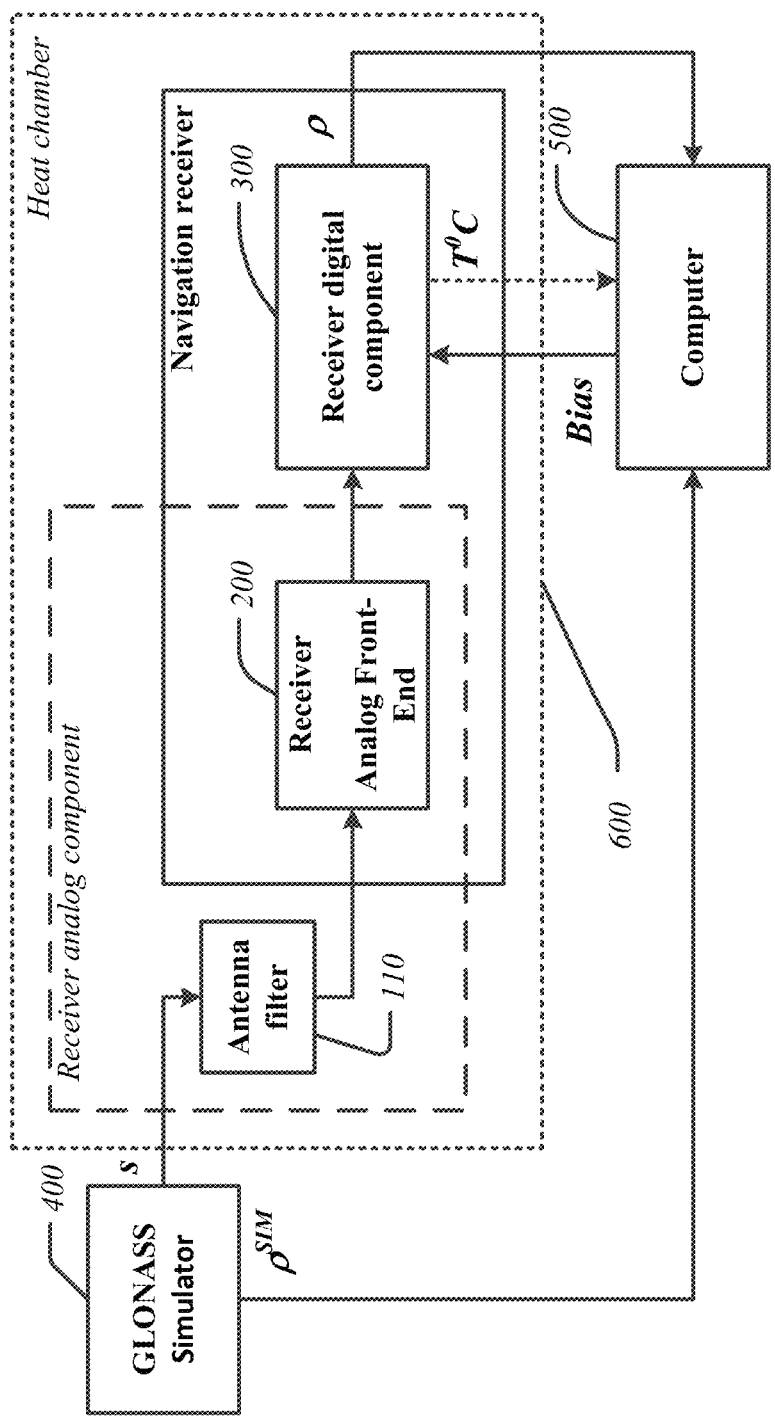
FIG. 6 shows a schematic of a test-bench to determine biases of receiver analog component.

To measure biases, the receiver is placed into a thermal chamber/oven enabling to fix needed temperature in its volume. A simulator sequentially or simultaneously generating signals on all operating GLONASS channel frequencies is connected to the input of the receiver analog component. Bias estimates are then generated for each channel frequency based on code measurements and according to equation (6). At the same time, the readings from the thermal sensor installed in the shielded analog Front End are stored in memory. Then, the temperature of the chamber is changed, and measurements are made again. The temperature in the chamber is changed at 10° C. increments within an adjusting range of at least 50° C. The obtained data set is stored in the receiver memory for further use during receiver service. In addition, based on the obtained data, the coefficients of the approximation function (9) are calculated and also stored in memory. To compute these coefficients, different mathematical methods can be used, for example, Ordinary Least Squares method (OLS). A schematic of a test bench to do measurements is shown in FIG. 6.

When a receiver receives GLONASS code measurements, current temperature is determined for the analog Front End, and a correction is generated depending on the measured temperature (for each channel frequency). Different interpolation and extrapolation methods can be chosen by the experienced engineer to compute these corrections. The corrections are further used according to (8) to diminish receiver code errors.

Another method to reduce code errors in navigation receivers is based on a considerable difference spectral characteristics of CA and P GLONASS signals and the specific characteristics of AFC and PFC SAW filter.

As has been previously said, the GLONASS satellites transmit both standard accuracy signals (CA) with the clock rate of 511 kHz and high-precision signals (P) with the clock rate of 5.11 MHz. This P-signal power is distributed in a wider bandwidth and takes about 5.11 MHz.

Figure 5A:
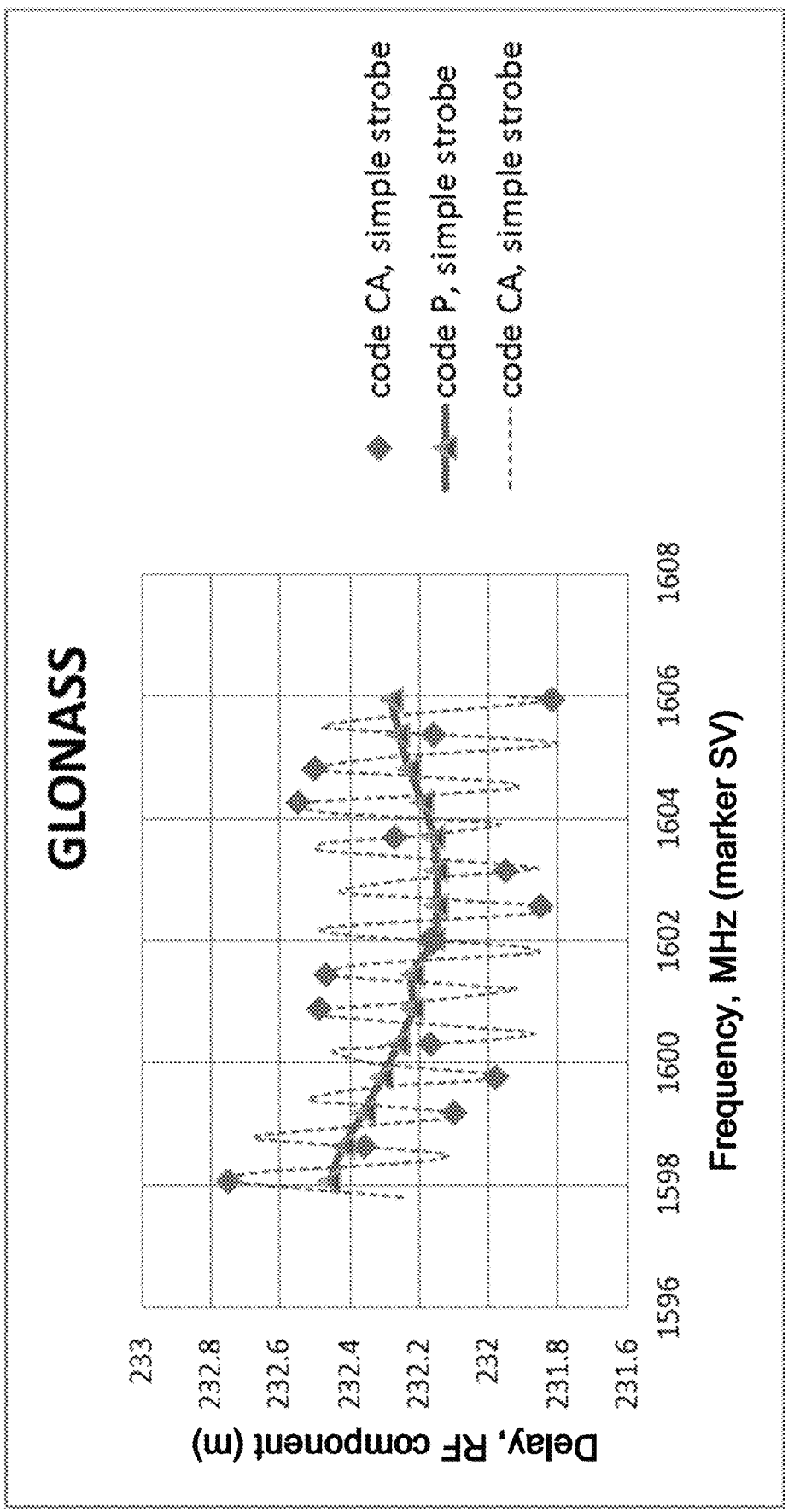
FIGS. 5A, 5B show a dependence of signal delay in the analog component on GLONASS frequency.

Researching AFC and PFC of SAW filters used in navigation receivers have shown that group delay (3) has a strong oscillation pattern. An example of changing the group delay (expressed in meters) depending on signal frequency is shown in FIG. 5A by a dotted line. Delays on frequencies corresponding to GLONASS channel numbers in the L1 band are marked with diamond symbols in this graph. The graph illustrates well, and researches prove that for narrow-band signals, depending on frequency, a filter delay varies according to the almost harmonic law with the amplitude of 0.5-0.7 m and period 630-700 kHz.

By applying P-signals with bandwidth ~5.0 MHz to obtain code measurements, one can considerably average delay variations, and the frequency-delay dependence in the filter reaches a comparatively monotonic pattern. A graph of such a dependence is presented in FIG. 5A with a solid line. Triangle symbol show delays corresponding different GLONASS channel numbers.

A study of temperature stability of corrections measured with the help of P-signals has shown that a temperature change in the receiver in the range up to 50° C. results in a delay change no greater than ±0.15 m.

Figure 1B:
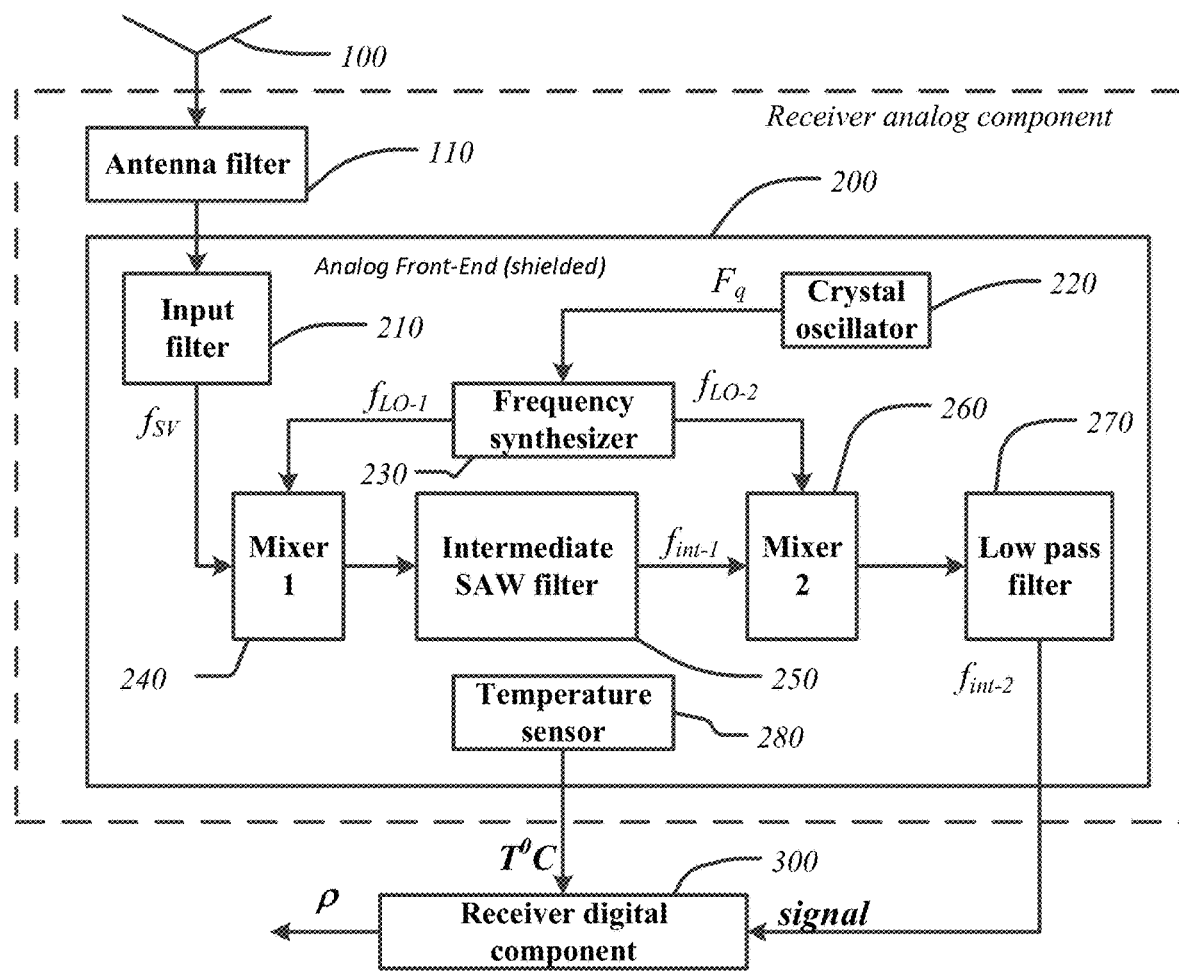
FIG. 1B shows a functional schematic of navigation receiver, its analog component and Front-End with a thermometer which is used to compensate inter-channel biases.
Figure 3B:
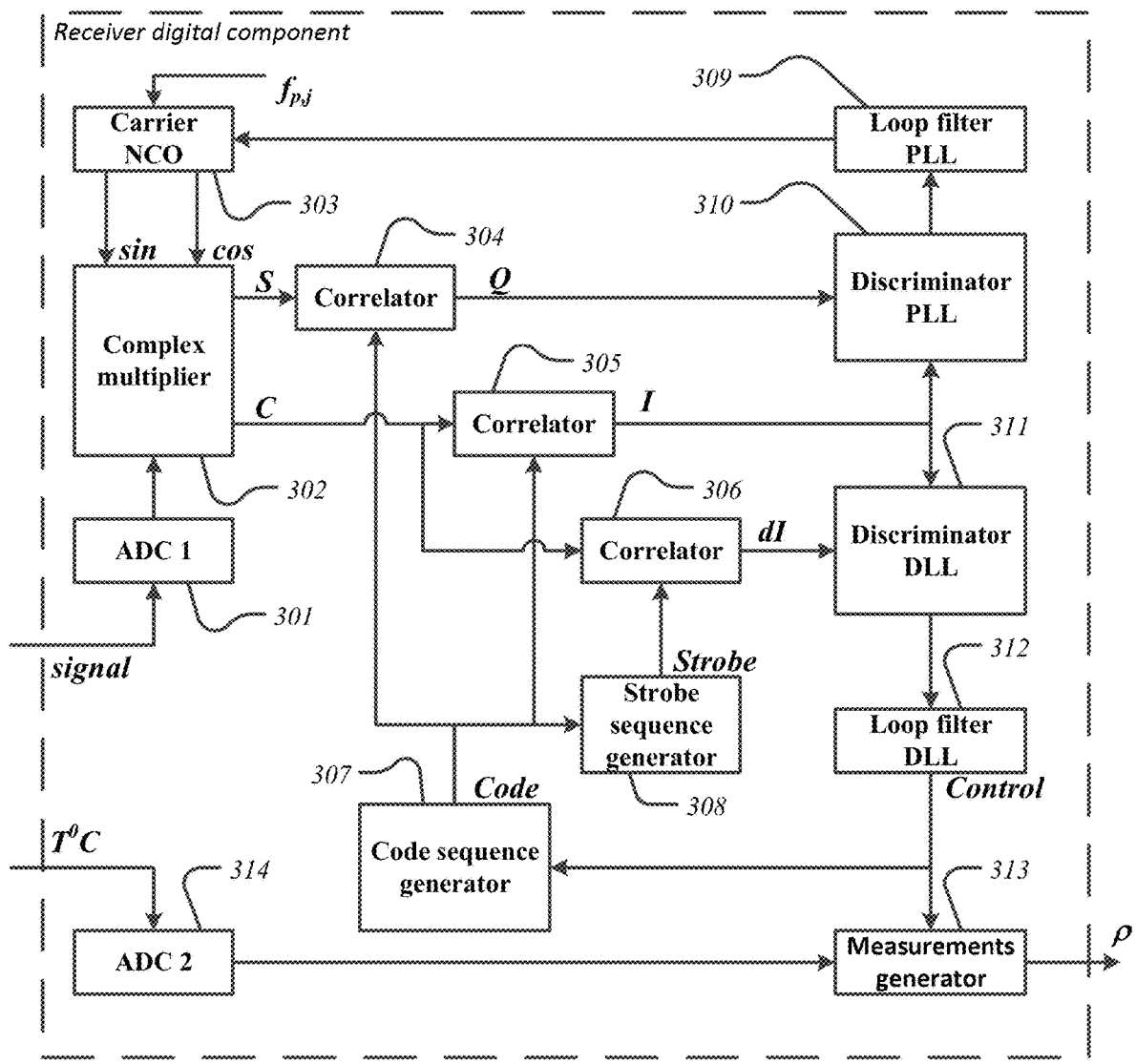
FIG. 3B shows a functional schematic of receiver digital component using a thermometer to compensate inter-channel biases.

To implement this method using the receiver diagram shown in FIG. 1B and FIG. 3B, the code sequence generator (307) has to generate a reference sequence corresponding to high-precision GLONASS signals. These signals should be generated by a GLONASS simulator. Computation of corrections in this case can be made without a thermal chamber at the standard operation temperature of the receiver, and the corrections may be applied without a temperature sensor even if the temperature intensely varies.

One more method of reducing code errors in case of GLONASS signals is based on the fact that when a signal passes through a filter its delay is proportional to the duration of the (wave) front, i.e., $\tau^{RF} \sim \tau^{front}$. As was mentioned, the signal is converted in the analog Front End, and the sign of the input signal envelope after the filter changes gradually, curves A) and B) in FIG. 2A illustrates this fact. It is also known that the slope of the DLL discriminator characteristic $$\frac{d(z^{dll}(\tau))}{d\tau}$$

for simple strobe sequences, shown in curve C) in FIG. 2A, is inversely proportional to the front duration $\tau^{front}$. Keeping the above in mind, one can write $$\frac{d(z^{dll}(\tau))}{d\tau} \sim \frac{1}{\tau^{front}} \sim \frac{1}{\tau^{RF}} \quad (10)$$

FIG. 4, graph (b), in particular, shows that when delay $\tau^{RF}$ increases, not only the working point of the discriminator characteristic shifts but also its slope decreases.

Expressions (10) enable to propose two ways of stabilizing the working discriminator point when the delay in the filter changes.

One way is to use a DLL discriminator as follows $$z^{dll} = \frac{dI}{I} + h \quad (11)$$

Where correlation signal dI is generated with a simple strobe sequence shown in curve C) of FIG. 2A, and the parameter h is selected according to the condition below depending on the filters used $$h \cong \frac{\tau^{strobe}}{2 \cdot \tau_{chip}} \quad (12)$$

A comparison of FIG. 4, graph (c) and FIG. 4, graph (a) shows that the discriminator working point can be shifted in $\delta\tau$ by varying parameter h. FIG. 4, graph (d) clearly illustrates the fact that shift $\delta\tau$ depends on both the parameter h and the slope of the discriminator characteristic $$\frac{d(z^{dll}(\tau))}{d\tau},$$

and the sign of shifting is inverse to the sign of the delay change $\tau^{RF}$. FIG. 4, graph (d) also shows that parameter h allows a remarkable reduction in position change of the working discriminator point when filter delay $\tau^{RF}$ changes considerably. Therefore, both temperature changes in the receiver analog component delay can be reduced and delay differences in PFC non-linearity-related delays of the receiver analog component on different channel numbers can be compensated.

The other way of obtaining a similar discriminator characteristic is to use strobe sequences of special types. The main feature of these sequences, unlike those described earlier is strobe position, which is related not only to the transition moments (i.e., a change of the code sign) but also to non-transitions. In other words, the position of each strobe in the sequence should be related to the PRN chip boundaries. The number of transitions and non-transitions in the GLONASS PRN code differs by the value of unity/one, correlation signal dI also changes by some value δ, and value $$h = \frac{\delta}{I} \cong \frac{\tau^{strobe}}{2 \cdot \tau_{chip}}$$

is added to the signal at the DLL discriminator output. Note that, similar to the previous case, the position of the working discriminator point does not practically change.

An additional possibility of adjusting the compensation degree can be achieved by applying the special sequence of sign-variable strobes. Each strobe in this sequence is presented as a sequence of different sign elements. An example of such a sequence is given in FIG. 2A, curve (E). By selecting the ratio of positive and negative elements in the sign-alternating strobe one can adjust the degree of compensation for delay changes in the receiver analog component, but a certain condition is to be met in this case: the area under curve following the strobe shape is to be different from zero, i.e., the number of positive and negative elements in the strobe is unequal.

Figure 5B:
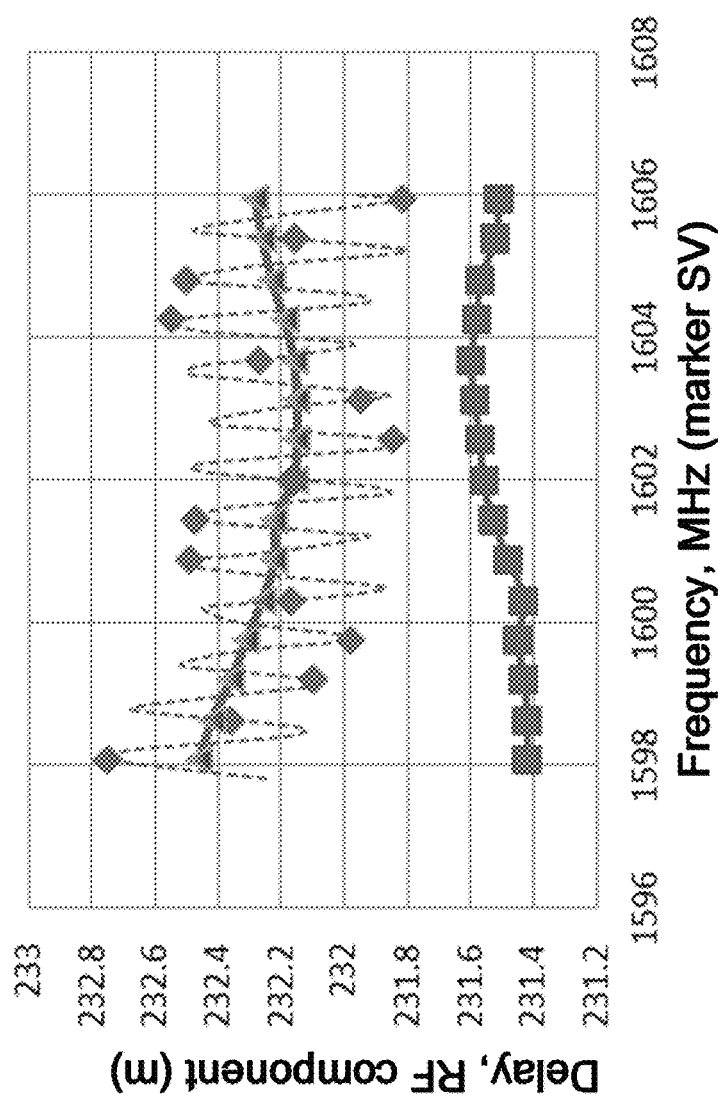

An example of the two methods is shown in FIG. 5B. A dependence of estimates for analog Front End delays is symbolled with squares on GLONASS channel numbers in the L1 band. In the graph one can see that delays on different channel numbers are changed over than ±0.1 m, but their average value noticeably differs from the average obtained other previously-considered methods.

As already stated, in navigation receivers a range-difference positioning technique is used, the average estimate bias does not therefore affect positioning errors, and does not regard as measuring errors.

Researches have shown that the above-mentioned methods allow obtaining a difference between code measurements on different GLONASS channel number frequencies no more than ±0.1 m ... ±0.15 m even if the temperature varies in a wide range.

When using this method the code sequence generator (307) can generate both the standard-precision signal and high-precision signal. The strobe sequence generator (308) is to generate a strobe sequence according to one of the mentioned methods. Similar to the previous example, the receiver can be built in accordance with FIG. 1B and FIG. 3B, and correction measurements are performed without a thermal chamber at standard operation temperature of the receiver. The corrections can be used without a temperature sensor even if the temperature considerably varies.

A block-diagram of the test bench enabling an implementation of the methods is shown in FIG. 6.

Simulation satellite signals s are fed from a GLONASS simulator (400) to the input of an antenna filter (110), and then to the input of the receiver analog Front End (200). Code measurements p are fed from the output of the digital component (300) and stored in a computer (500). In addition, some digital information about the simulated signal arrival time $\rho^{SIM}=c \cdot t^{SIM}$ is transmitted from the simulator (400) to computer (500). DD biases for all GLONASS channel number frequencies are calculated in the computer (500) (see above) and written in the receiver memory to use further for primary code measurement corrections.

For the first method, Front-End temperature data in T° C., at which code measurements ρ have been made, is additionally transmitted from the digital component (300) to the computer (500). As said, in this case, all equipment including the antenna filter (110), analog Front End (200), and the receiver digital component (300) are placed into the thermal chamber (600), to obtain a dependence of $DD^T(T)$ biases in the computer (500). The described-above method allows specialists to understand the operation procedure and peculiarities of this test bench.

A developer of navigation receivers can select one or other proposed methods, their combinations and parameters based on his own considerations and experience depending on the filters used in the receiver analog Front End and technological features of digital component design.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES

1. U.S. Pat. No. 6,608,998 B 1, Neumann et al., Method for reducing inter-frequency bias effects in a receiver;
2. EP2204664 A2, Yudanov et al., Inter-channel bias calibration for navigation satellite system;
3. U.S. Pat. No. 6,266,007 B 1, Gary R. Lennen, Code group delay calibration using error free real time calibration signal;
4. EP 1031845 A2, Miroslaw Balodis, Receiver calibration technique for glonass, Leica Geosystems Inc.
5. US 20070008216 A1, Ganguly et al., GPS receiver with calibrator;
6. *Algorithms to Calibrate and Compensate for GLONASS Biases in GNSS RTK Receivers working with 3rd party Networks*, Aleksey Boriskin, Gleb Zyryanov, Magellan, Russia, ION GNSS 21st. International Technical Meeting of the Satellite Division, 16-19, Sep. 2008, Savannah, Ga.
7. *GLONASS Receiver Inter-frequency Biases—Calibration Methods and Feasibility*, J. B. Neumann, M. Bates, R. S. Harvey Novatel Inc. ION GPS '99, 14-17 Sep. 1999, Nashville, Tenn.
8. A. D. Boriskin, A. V. Veitsel, V. A. Veitsel, M. I. Zhodzishsky, D. S. Milyutin, *High precision positioning equipment for global positioning navigation satellite systems: receivers-end users of navigation information*, M. I. Zhodzishsky, Ed., Moscow, MAI-Print, 2010.
9. *GLONASS. Design concepts and operation*, A. I. Perov, V. N. Kharisov, Eds., 3rd edition, Moscow, Radiotechnika, 2005.

What is claimed is:

1. A method of reducing inter-channel bias in a GLONASS receiver, the method comprising:

forming primary code measurements in the GLONASS receiver that includes an Analog Front-End and a multiple digital channels, each channel including a Delay Locked Loop (DLL), the Analog Front-End receiving different GLONASS signals at different frequencies from different GLONASS satellites;

wherein each DLL includes a code sequence generator, a strobe generator, a correlator, a discriminator, and a loop filter, connected in a feedback loop, wherein the strobe generator forms a strobe sequence of strobes, one strobe for every PRN code chip received from a GLONASS satellite by the Analog Front-End and the DLL, with a position of each strobe center coinciding with a boundary of each PRN code chip, and a sign (+ or −) of each strobe corresponds to a sign (+ or −) of a next PRN code chip, wherein each strobe from the strobe generator has a number of opposite sign elements (both +1 and −1) such that a number of positive elements (+1's) is different from a number of negative elements (−1's), and a sign of the strobe is a sum of signs of all the elements;

each channel calculating the primary code measurements based on an output of its DLL; and generating current coordinates based on the calculated primary code measurements.

2. The method of claim 1, wherein a ratio of the positive elements and the negative elements in each strobe is 3:1 or 1:3.

3. The method of claim 1, wherein a working point of the discriminator of the DLL, at which an output of the discriminator is zero, shifts in time in a direction opposite of a temperature-dependent shift in the Analog Front-End, so as to compensate for temperature dependence of the delay for each GLONASS satellite.

4. The method of claim 3, further comprising using a GLONASS simulator to additionally reduce the differences in the delay, by taking into account a difference in delay of the signals from a simulator of the GLONASS satellites in the analog Front-End, and based on previous the primary code measurements at constant temperature.

5. The method of claim 3, further comprising adding a constant h to an output signal of the discriminator, where $$0 < h < \frac{\tau^{strobe}}{2\tau_{chip}},$$

$\tau^{strobe}$ is a duration of the strobes, and $\tau_{chip}$ is a duration of the PRN chip.

6. A GLONASS receiver with reduced inter-channel bias, comprising:

an antenna receiving signals from GLONASS satellites, the signals including PRN code chips;

an Analog Front-End receiving and processing the signals received by the antenna, the Analog Front-End including a filter receiving that provides the filtered signals to a digital processing module that includes multiple channels, each channel including a DLL and a measurements generator;

the measurements generator producing primary code measurements based on an output of its DLL; and a processor for calculating current coordinates based on the primary code measurements, wherein each DLL includes a code sequence generator, a strobe generator, a correlator, a discriminator, and a loop filter, connected in a feedback loop, wherein the strobe generator forms a strobe sequence of strobes, one strobe for every PRN code chip received from a GLONASS satellite by the Analog Front-End and the DLL, with a position of each strobe center coinciding with a boundary of each PRN code chip, and a sign (+ or −) of each strobe corresponds to a sign (+ or −) of a next PRN code chip, wherein each strobe from the strobe generator has a number of opposite sign elements (both +1 and −1) such that a number of positive elements (+1's) is different from a number of negative elements (−1's), and a sign of the strobe is a sum of signs of all the elements.

7. The GLONASS receiver of claim 6, wherein a ratio of the positive elements and the negative elements in each strobe is 3:1 or 1:3.

8. The GLONASS receiver of claim 6, wherein a constant h is added to an output signal of the discriminator, where $$0 < h < \frac{\tau^{strobe}}{2\tau_{chip}},$$

$\tau^{strobe}$ is a duration of the strobes, and $\tau_{chip}$ is a duration of the PRN chip.

9. The GLONASS receiver of claim 6, wherein the code sequence is generated for both GLONASS PRN CA code and GLONASS PRN P-code.

10. The GLONASS receiver of claim 6, wherein a working point of the discriminator of the DLL, at which an output of the discriminator is zero, shifts in time in a direction opposite of a temperature-dependent shift in the Analog Front-End, so as to compensate for temperature dependence of the delay for each GLONASS satellite.

11. The GLONASS receiver of claim 10, wherein a GLONASS simulator is used to additionally reduce the differences in the delay, by taking into account a difference in delay of the signals from a simulator of the GLONASS satellites in the analog Front-End, and based on previous the primary code measurements at constant temperature.

12. The GLONASS receiver of claim 11, wherein the primary code measurements are corrected using measurements obtained previously by using the GLONASS simulator, and wherein the processor calculates the current coordinates based on the corrected primary code measurements.

* * * * *